US012093072B2

(12) United States Patent
Hosomizo

(10) Patent No.: US 12,093,072 B2
(45) Date of Patent: Sep. 17, 2024

(54) SUPPORTING PROGRAM FOR CONTROL OF INFORMATION PROCESSING APPARATUS OBTAINS PRINT JOB, CREATES NEW JOB NAME, AND TRANSMITS TO VIRTUAL PRINTER

(71) Applicant: BROTHER KOGYO KABUSHIKI KAISHA, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/527,786

(22) Filed: Dec. 4, 2023

(65) Prior Publication Data

US 2024/0103788 A1   Mar. 28, 2024

Related U.S. Application Data

(63) Continuation of application No. 18/184,743, filed on Mar. 16, 2023, now Pat. No. 11,880,622.

(30) Foreign Application Priority Data

Mar. 25, 2022 (JP) .................................. 2022-050422

(51) Int. Cl.
*G06F 3/12* (2006.01)

(52) U.S. Cl.
CPC .......... *G06F 3/1267* (2013.01); *G06F 3/1205* (2013.01); *G06F 3/1228* (2013.01); *G06F 3/1288* (2013.01)

(58) Field of Classification Search
CPC .... G06F 3/1205; G06F 3/1228; G06F 3/1267; G06F 3/1288
See application file for complete search history.

(56) References Cited

U.S. PATENT DOCUMENTS

| | | | |
|---|---|---|---|
| 6,542,252 B2 * | 4/2003 | Brossman | G06F 3/1245 358/1.15 |
| 7,075,670 B1 | 7/2006 | Koga | |

(Continued)

FOREIGN PATENT DOCUMENTS

JP    2018-120334 A    8/2018

OTHER PUBLICATIONS

Notice of Allowance dated Sep. 26, 2023 from parent application U.S. Appl. No. 18/184,743.

*Primary Examiner* — Scott A Rogers
(74) *Attorney, Agent, or Firm* — Scully, Scott, Murphy & Presser, PC

(57) ABSTRACT

A non-transitory storage medium stores a supporting program executable by a computer of an information processing apparatus. The supporting program causes the information processing apparatus to execute obtaining a print setting, generating a character string for displaying indicating at least a part of the obtained print setting, obtaining image data indicating the image of a selected print job, and transmitting the print job and the generated character string for displaying in a state in which the print job and the character string for displaying are associated with each other. The job name and the character string for displaying are displayed on a display of a connected printer in the state in which the job name and the character string for displaying are associated with each other.

8 Claims, 10 Drawing Sheets

(56) References Cited

U.S. PATENT DOCUMENTS

| | | |
|---|---|---|
| 7,184,159 B2 | 2/2007 | Bergstrand |
| 7,619,765 B2 | 11/2009 | Kimura et al. |
| 7,852,497 B2 | 12/2010 | Sato |
| 8,654,379 B2 | 2/2014 | Suzuki |
| 8,736,856 B2 | 5/2014 | Byun et al. |
| 8,773,699 B2 | 7/2014 | Suzuki |
| 11,086,579 B2 | 8/2021 | Morita |
| 11,520,536 B2 | 12/2022 | Suzuki et al. |
| 11,586,401 B2 | 2/2023 | Morita |
| 2018/0210686 A1 | 7/2018 | Takigawa et al. |
| 2021/0240413 A1 | 8/2021 | Hanai |
| 2021/0286564 A1 | 9/2021 | Miyabe |

\* cited by examiner

FIG.7

CONFIGURATION SETTING SCREEN (D1)

SELECT ITEMS OF PRINT SETTING TO BE INCLUDED INTO CHARACTER STRING FOR DISPLAYING SET ORDER AND CHARACTER FOR ITEMS
ITEMS ARE SELECTABLE UP TO THREE

| ITEM NAME | ITEM SELECTING COLUMN | ORDER SETTING COLUMN | CHARACTER SETTING COLUMN | |
|---|---|---|---|---|
| | | | PARAMETER | CHARACTER |
| SHEET SIZE | ✓ | 1 | A3 SIZE | A3 |
| | | | A4 SIZE | A4 |
| | | | B5 SIZE | B5 |
| COLOR PRINTING | ✓ | 2 | COLOR | C |
| | | | MONOCHROME | M |
| DUPLEX PRINTING | | | SIMPLEX PRINTING | |
| | | | DUPLEX PRINTING | |

[COMPLETE] (SW1)　[CANCEL]

| JOB NAME | PRINT SETTING |
|---|---|
| JN1 | A3, COLOR |
| JN2 | A4, MONOCHROME |

LIST OF PRINT JOBS

SUPPORTING PROGRAM FOR CONTROL OF INFORMATION PROCESSING APPARATUS OBTAINS PRINT JOB, CREATES NEW JOB NAME, AND TRANSMITS TO VIRTUAL PRINTER

REFERENCE TO RELATED APPLICATIONS

This application is a continuation application of U.S. Ser. No. 18/184,743 filed on Mar. 16, 2023 and claims priority from Japanese Patent Application No. 2022-050422 filed on Mar. 25, 2022. The entire contents of each of which is incorporated herein by reference.

BACKGROUND ART

The following disclosure relates to a non-transitory storage medium storing a supporting program that supports a control of a printer and a printing system.

A technique in which a general-purpose printing program installed in a standard operating system, which is the OS that comes standard with the general-purpose printing program, controls an external printer without using a printer driver has been commercialized recently. In this technique, when the OS detects the external printer, the OS establishes an association between the general-purpose printing program installed in the OS and the external printer. After that, in a case where an instruction for a print execution to the external printer is received, printing by the general-purpose printing program installed in the OS becomes available without using the printer driver.

Moreover, a technique related to what is called a cloud printing system in which a cloud server on the Internet is chosen as a virtual printer has been known. In the cloud printing system, a print job is transmitted to the virtual printer from the general-purpose printing program installed in the OS, and a printer connected to the cloud server performs printing by obtaining the print job. A technique of choosing a print job which is to be printed in a printer, like the cloud printing system, is known as, for example, a configuration in which a multifunction peripheral displays a list of the print jobs each associated with a login user by obtaining the list from a printer server and the multifunction peripheral obtains the print job which is chosen by the user.

DESCRIPTION

In the cloud printing system, there is a case in which a plurality of printers, supporting functions of which are different from each other, access the cloud server, and the general-purpose printing program of the OS, that transmits the print job to the cloud server, cannot recognize which printer prints the print job. Accordingly, a print setting is not limited and, when the print job is selected to be printed in the printer, there is a possibility that the print job which is not executable by the printer is selected. Therefore, there is a room for improvement.

An aspect of the disclosure relates to a non-transitory storage medium storing a supporting program capable of decreasing a possibility that the user selects the print job which is not executable by the printer.

In one aspect of the disclosure, a non-transitory storage medium stores a supporting program executable by a computer of an information processing apparatus. The supporting program is configured to support a printing program of an operating system of the information processing apparatus. The information processing apparatus is connectable to a virtual printer in a server on a network, and the server is capable of receiving and storing a plurality of print jobs that are transmitted to the virtual printer. A connected printer connected to the server is configured to receive a selection of a print job, that is to be printed, of the plurality of print jobs stored in the server and receive the selected print job from the server, the connected printer being capable of printing based on the received print job. The supporting program, when executed by the computer, causes the information processing apparatus to execute, when being requested from the printing program of the operating system for processing in response to receipt of a print instruction, outputted from an application program installed on the information processing apparatus, for causing the printing program of the operating system to perform printing of an image, a destination of which is set to the virtual printer, obtaining a print setting associated with the print instruction from the printing program of the operating system, generating a character string for displaying indicating at least a part of the obtained print setting, obtaining, from the printing program of the operating system, image data indicating the image, which is to be printed, of the selected print job, and transmitting, to the virtual printer, (i) the print job, for causing information processing apparatus to print based on the obtained image data, and (ii) the generated character string for displaying in a state in which the print job and the character string for displaying are associated with each other. The print job transmitted to the virtual printer is stored in the server in the state in which the print job is associated with the character string for displaying transmitted to the virtual printer, and, in response to a request from the connected printer to the server, a job name of the stored print job and the character string for displaying are passed to the connected printer in a state in which the job name and the character string for displaying are associated with each other. The job name and the character string for displaying each passed to the connected printer are displayed on a display of the connected printer in the state in which the job name and the character string for displaying are associated with each other.

In another aspect of the disclosure, a printing system comprises a supporting program of an information processing apparatus and a connected printer connected to a server. The supporting program is executable by a computer of the information processing apparatus and is configured to support a printing program of an operating system of the information processing apparatus. The information processing apparatus is connectable to a virtual printer in the server on a network. The supporting program, when executed by the computer, causes the information processing apparatus to execute: when being requested from the printing program of the operating system for processing in response to receipt of a print instruction, outputted from an application program installed on the information processing apparatus, for causing the printing program of the operating system to perform printing of an image, a destination of which is set to the virtual printer, obtaining a print setting associated with the print instruction from the printing program of the operating system, generating a character string for displaying indicating at least a part of the obtained print setting, obtaining, from the printing program of the operating system, image data indicating the image, which is to be printed, of the selected print job, and transmitting, to the virtual printer, (i) the print job, for causing information processing apparatus to print based on the obtained image data, and (ii) the generated character string for displaying in a state in which the print job and the character string for displaying are associated with each other. The server stores the print job and the character string each transmitted to the virtual printer in the state in which the print job and the character string are associated with each other and, in response to a request from the connected printer, passes, to the connected printer, a job name of the stored print job and character string for display in a state in which the job name and the character string for display are associated with each other. The connected printer obtains the job name and the character string for displaying each passed from the server after outputting the request to the server, and receives an execution instruction of the print job corresponding to the job name by displaying the obtained job name and the character string for displaying on a display of the connected printer in the state in which the job name and the character string are associated with each other.

The objects, features, advantages, and technical and industrial significance of the present disclosure will be better understood by reading the following detailed description of the embodiments, when considered in connection with the accompanying drawings, in which:

FIG. 7 is a view illustrating an example of a configuration setting screen;

FIG. 10 is a view illustrating an example of the display.

There will be described in details below a personal computer 1, which may be hereinafter referred to as the PC 1, using a supporting program of the present embodiment, with reference to the drawings. The present disclosure discloses a printing system configured to cause a printer to perform printing by a print job sent from a general-purpose printing program installed in an operating system via a cloud printing system.

FIRST EMBODIMENT

Figure 1:
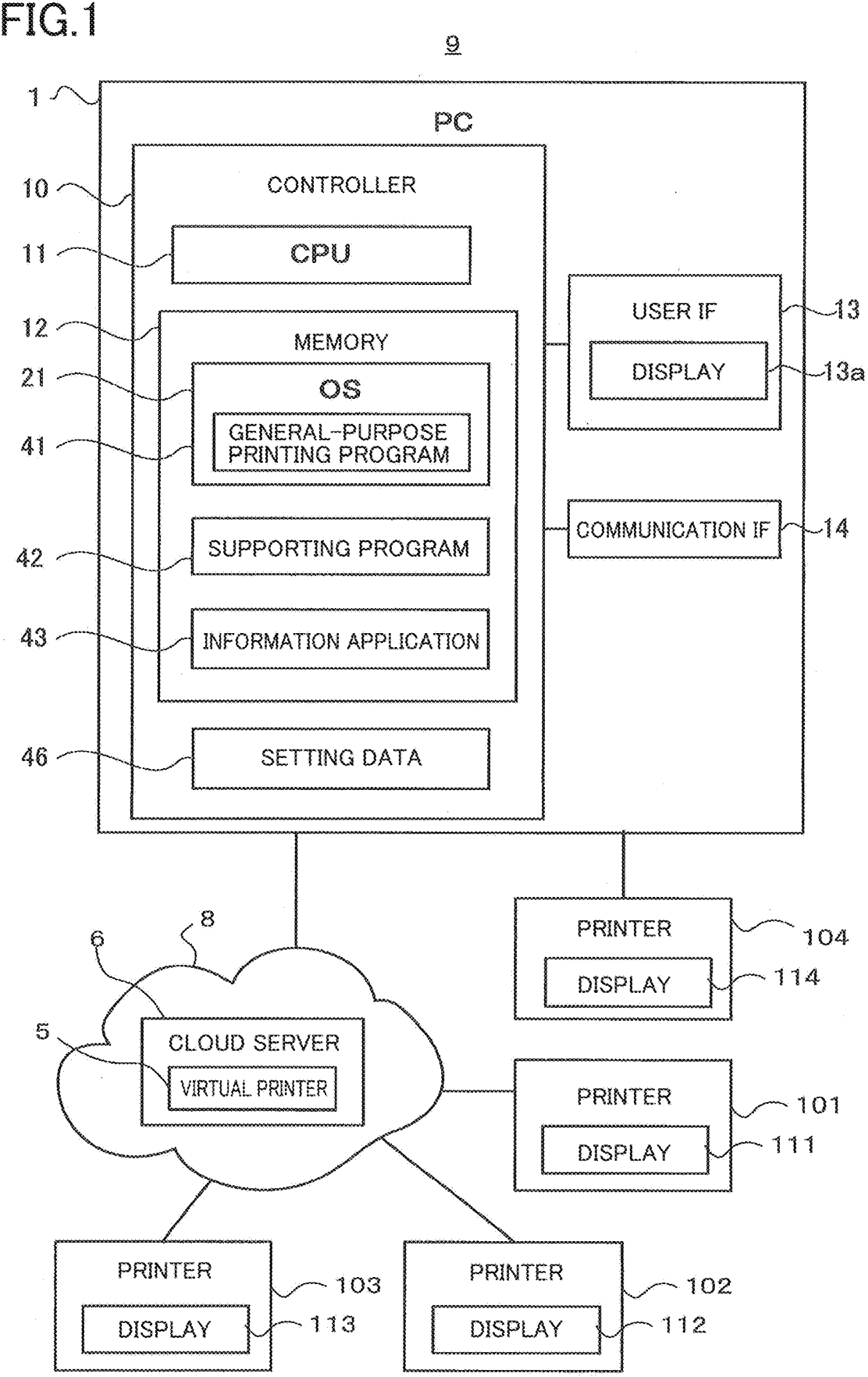
FIG. 1 is a schematic view of a configuration of a printing system.

FIG. 1 is a schematic view of a configuration of a printing system 9. The printing system 9 includes the PC 1 and a plurality of printers 101,102,103,104. The printer 104 may be connected to the Internet 8 and may be directly connected to the PC 1. The PC 1 and the printers 101,102,103 are communicatable with a cloud server 6 provided on the Internet 8. A virtual printer 5 is provided in the cloud server 6. In contrast to the printers 101,102,103,104, which are physical real printers, the virtual printer 5 is a logical printer which is virtually treated as one printer. It is noted that the physical real printer may be hereinafter referred to "a real printer" for simplicity of description.

The printing system 9 is, for example, a system using a cloud service provided by Microsoft and is configured to achieve a universal printing in which printing is performed via the virtual printer 5. That is, the cloud server 6 is capable of being provided by companies other than the manufacturer of the printer. The Internet 8 is an example of a network. The cloud server 6 is an example of a server.

As illustrated in FIG. 1, the PC 1 of the present embodiment includes a controller 10 having a CPU 11 and a memory 12. The PC 1 is an example of an information processing apparatus. The CPU 11 is an example of a computer. Moreover, the PC 1 includes a user interface 13, which may be hereinafter referred to as the user IF 13, and a communication interface 14, which may be hereinafter referred to as the communication IF 14. The user IF 13 and the communication IF 14 are electrically connected to the controller 10. It is noted that the controller 10 in FIG. 1 is a general term for hardware and software used in a control of the PC 1, and the controller 10 is not limited to a single piece of hardware actually existing in the PC 1. The CPU 11 executes various kinds of processes in accordance with various kinds of programs read from the memory 12 or based on operations by a user. The various kinds of programs and various kinds of data are stored in the memory 12. The memory 12 is also used as a work area at which the various kinds of processes are executed. A buffer in the CPU 11 is also an example of the memory 12. It is noted that the example of the memory 12 is not limited to a ROM, a RAM, a HDD and so on each built into the PC 1, and the example of the memory 12 may be a storage medium readable and writable by the CPU 11 such as a CD-ROM, a DVD-ROM.

The user IF 13 includes hardware configured to display a screen for notifying information to the user and hardware that receives operations by the user. It is noted that the user IF 13 may be a combination of a display 13a capable of displaying information and a mouse, a keyboard and so on each having a function of receiving an input. The user IF 13 may be a touch panel having the display 13a and a function of receiving an input.

The communication IF 14 includes hardware configured to communicate with an external device such as the printer 104. Communication standard of the communication IF 14 includes Ethernet, Wi-Fi, USB and so on. Each of Ethernet, Wi-Fi, USB is a registered trademark. The PC 1 may be connectable to the Internet 8 via the communication IF 14. The PC 1 may include a plurality of communication IFs 14 respectively conforming to a plurality of kinds of the communication standard.

As illustrated in FIG. 1, an operating system 21 including a general-purpose printing program 41, a supporting program 42 and various kinds of application programs, which may be hereinafter referred to as the application, are stored in the memory 12 of the PC 1. The operating system 21 may be hereinafter referred to as the OS 21. The OS 21 is, for example, Windows, macOS, Linux, iOS or Android. Each of Windows, macOS, Linux, iOS and Android is a registered trademark. The general-purpose printing program 41 is an example of a printing program. The supporting program 42 is an example of a supporting program.

As various kinds of applications, for example, an information application 43 is installed on the PC 1 of the present embodiment. The information application 43 is, for example, a map application, a calendar application, or a browser application. The information application 43 has a function of causing the PC to display various kinds of information on the display 13a in accordance with requests from the user. The information application 43 is an example of an application program. It is noted that the information application 43 itself may not include a function of causing the printer 104 to print the displayed information.

The general-purpose printing program 41 is a standard program of the OS 21 provided together with the OS 21, and the general-purpose printing program 41 has a function of causing the printer 104 and so on to print information which is displayed on the display 13a by the information application 43 and so on. The general-purpose printing program 41 of the present embodiment is a program having a function of generating intermediate data based on image data of an image to be printed. The general-purpose printing program 41 supports functions commonly available for various kinds of models of printers supplied by various vendors. Different from a specific printer driver of each of the various kinds of models of the printers, the general-purpose printing program 41 does not support all of inherent functions of each of the various kinds of models of printers, and the general-purpose printing program 41 only supports general-purpose functions of each of the various kinds of models of the printers.

The supporting program 42 is a program or a program group configured to execute processes based on an instruction from the OS 21, and the execution by the supporting program 42 is accompanied by execution of processes by the general-purpose printing program 41. The supporting program 42 is a program configured to support a control of hardware which is to be controlled. The supporting program 42 of the present embodiment conforms to the model of the printer 104 connected to the PC 1, and, for example, the supporting program 42 is activated by the general-purpose printing program 41 in response to receipt of an instruction for causing the printer 104 to print by using the general-purpose printing program 41. The supporting program 42 is called as a print supporting application, the abbreviated name of which is PSA, or a hardware supporting application, the abbreviated name of which is HSA, for example.

It is noted that the supporting program 42 may be a combination of a plurality of programs each receiving an execution order, and the supporting program 42 may be a single program capable of executing different processes in accordance with different orders. Moreover, the supporting program 42 may be a program supplied for each of various types of the printers by the vendor of each of the printers. For example, each of a supporting program for an ink-jet printer and a supporting program for a laser printer may be provided. The supporting program is not limited to be provided for each of the various types of the printer, that is, a supporting program may be provided for each of the various kinds of models of the printers or may be provided for each of a plurality of series of the various kinds of models of the printers.

As illustrated in FIG. 1, the PC 1 of the present embodiment is connected to the cloud server 6 via the Internet 8. The cloud server 6 is an information processing apparatus having a communication function. The virtual printer 5 in the cloud server 6 receives, as one of the printers, a print job from the PC 1 and stores the print job. When receiving a request for transmitting the print job from the real printer, the virtual printer 5 can transmit the stored print job to the real printer.

When the real printer is connected to the PC 1, the OS 21 registers printer information which is information related to the real printer. Moreover, for example, when a virtual printer as a new printer is connected to the PC 1, the OS 21 registers, in the same manner as the real printer, the virtual printer as a printer connectable to the PC 1.

Each of the printers 101, 102, 103, 104 is a real printer having at least a printing function and a communicating function. Each of the printers 101,102,103,104 receives print data and a print setting from external devices, and prints in accordance with the print setting. The printers 101,102,103, 104 respectively include displays 111,112,113,114. The printer 104 is not connected to the cloud server 6. Each of the printers 101,102,103 is connected to the cloud server 6 so as to be communicatable with the cloud server 6. In a case where each of the printers 101,102,103 are connected to the cloud server 6, each of the printers 101,102,103, for example, requests for transmitting the print job stored in the virtual printer 5, receives the print job from the virtual printer 5, and performs printing based on the print job.

In the present embodiment, the printers 101,102,103 respectively support functions, and the functions are different from each other. For example, the printer 101 is a device capable of supporting a sheet size equal to or smaller than the A3 size, and is capable of supporting both color printing and monochrome printing. The printer 102 is a device capable of supporting a sheet size equal to or smaller than the A4 size, and is capable of supporting only monochrome printing. The printer 103 is a device capable of supporting a sheet size equal to or smaller than the A4 size, and is capable of supporting both color printing and monochrome printing.

The supporting program 42 is registered, at the time of installing, in the general-purpose printing program 41 or the OS 21 as a program activated based on selection of the printer 104. Moreover, the supporting program 42 also registered in the general-purpose printing program 41 or the OS 21 as a program activated based on selection of the virtual printer 5.

In a case where a print instruction is received in a state in which the virtual printer 5 is selected, the supporting program 42 of the present embodiment has a function of generating a character string for displaying and transmitting the generated character string for displaying and the print job to the virtual printer 5 in a state in which the generated character string for displaying and the print job are associated with each other. The character string for displaying is a character string indicating at least a part of the print setting and displayable on the display of the real printer.

Setting data 46 is stored in the memory 12. The setting data 46 is information indicating a configuration of the character string for displaying generated by the supporting program 42. The setting data 46 of the present embodiment is stored in a predetermined area in the memory 12 with a predetermined name, however, a path of the setting data 46 which is to be read may be registered in the supporting program 42. The configuration of the character string for displaying is set to the setting data 46 by a setting process, which will be described below.

Figure 2:
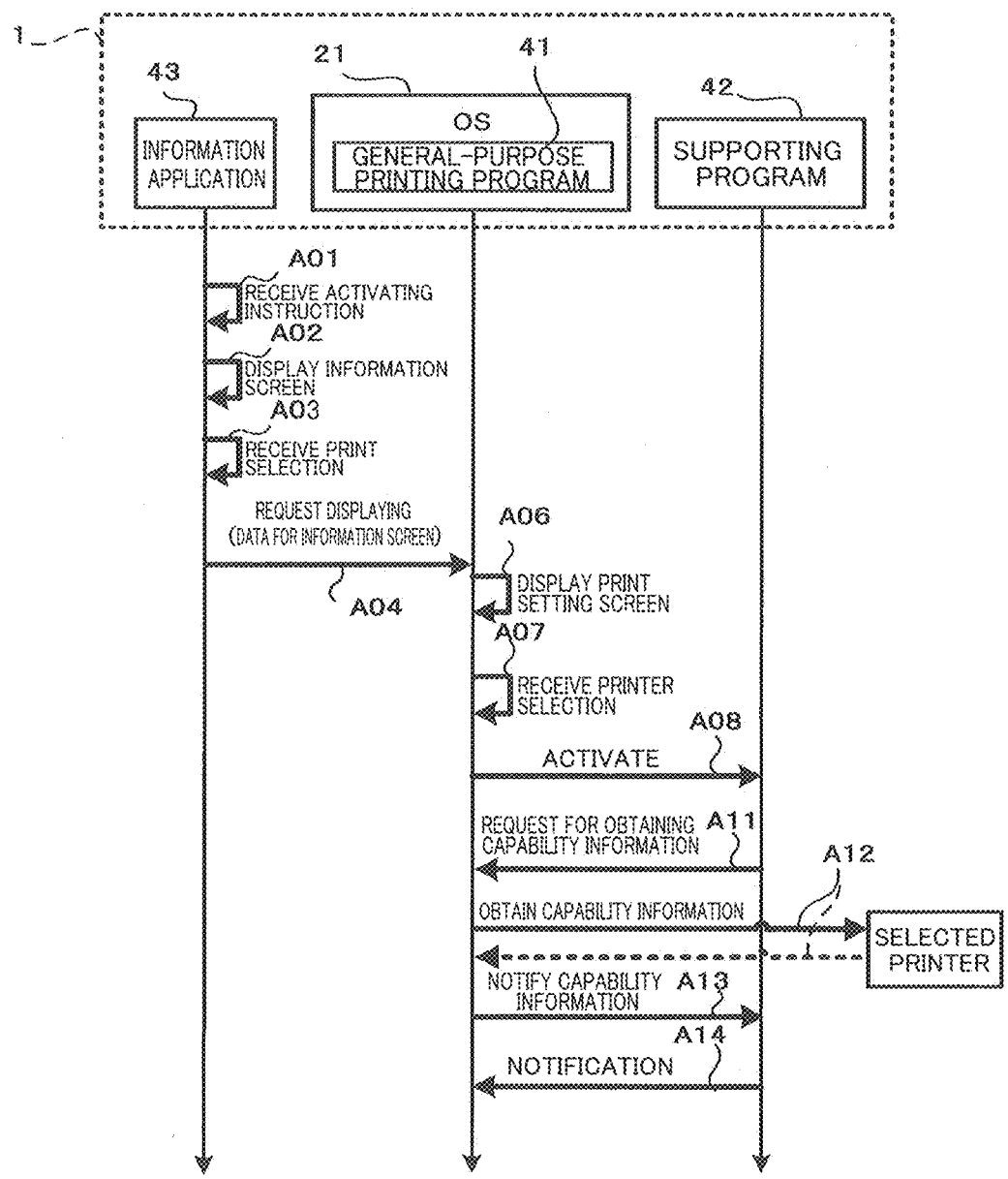
FIG. 2 is a sequence of steps performed in a case where printing is selected.

Next, there will be described printing steps, including operations of the supporting program 42 of the present embodiment, of each of the general-purpose printing program 41, the supporting program 42 and the information application 43 performed in a case where printing is selected in the information application 43, with reference to a view of a sequence illustrated in FIG. 2. It is noted that the view of the sequence in FIG. 2 and views of other sequences, which will be described below, illustrates operations performed in a case where the supporting program 42 conforming to the printer 104 and the virtual printer 5 has been installed on the PC 1.

It is noted that each of steps of processes in the following explanation, flowcharts and sequences basically indicate processes performed by the CPU 11 in accordance with orders described in the program such as the supporting program 42. The process performed by the CPU 11 includes a hardware control using an API of the OS 21. In the present disclosure, there will be described operations of each of the programs, and a detailed explanation of the OS 21 is dispensed with. Moreover, "obtainment" is used as a concept not requiring a request.

At the beginning of the steps, the user activates the information application 43 at A01. At A02, the information application 43 causes the PC 1 to display an information screen including various kinds of information on the display 13*a* in accordance with an instruction from the user. In a case where the user wishes to print an image based on the information screen which is being displayed, the user selects printing on the information screen at A03. The information application 43 transmits a display request and data of the information screen to the general-purpose printing program 41 of the OS 21 at A04. The information application 43 transmits the data of the information screen in a file format in accordance with own capability. Accordingly, the general-purpose printing program 41 receives image data of an image, which is to be printed, in the file format in accordance with capability of a sender of the data such as the information application 43.

The general-purpose printing program 41 causes the PC 1 to display a general-purpose print setting screen on the display 13*a* in response to the display request at A06. The general-purpose print setting screen is a screen configured to receive the instruction for setting the print setting and an instruction for a print execution. The general-purpose print setting screen may display a preview screen of the data received from the information application 43 at A04.

At A07, the user can select the printer in the general-purpose print setting screen which is being displayed. For example, in a case where the selected printer is the printer 104 or the virtual printer 5, the general-purpose printing program 41 activates the supporting program 42 and transmits a request for a process corresponding to the selection of the printer at A08. At A08, the general-purpose printing program 41 passes, to the supporting program 42, information related to the selected printer and information related to the print setting which is being set at the time of the selection of the printer 104.

It is noted that, in a case where the printer 104 is set to the printer usually used in the OS 21, the general-purpose printing program 41 displays, at A06, the general-purpose print setting screen in a state in which the printer 104 is being selected, and the general-purpose printing program 41 activates the supporting program 42 at A08. That is, the printer 104 is automatically selected by the OS 21, and the general-purpose printing program 41 performs the process of A08 based on the information of the selected printer 104. In this case, the user does not need to perform the operation at A07 by the user. In a case where the virtual printer 5 is set to the printer usually used in the OS 21, the above described same processes are performed.

Moreover, the information application 43 may cause the PC 1 to display the general-purpose print setting screen on the display 13*a* instead of the general-purpose print setting screen displayed by the general-purpose printing program 41. In this case, the information application 43 activates the general-purpose printing program 41 in response to the selection of printing at A03, obtains data of an image for displaying the image on the general-purpose print setting screen from the general-purpose printing program 41, and causes the PC 1 to display the general-purpose print setting screen on the display 13*a*. Then, the information application 43 passes the information related to the selected printer 104 or the virtual printer 5 to the general-purpose printing program 41 in accordance with a state in which the printer 104 or the virtual printer 5 is being selected or a state in which the printer 104 or the virtual printer 5 is selected at A07. As a result of this, the general-purpose printing program 41 activates the supporting program 42 at A08.

At A11, the supporting program 42 transmits, to the OS 21, a request for capability information of the selected printer in response to the activation of the supporting program 42. For example, in a case where the printer 104 is selected at A07, the OS 21 transmits an obtaining request for obtaining the capability information to the printer 104 in response to receipt of the request from the supporting program 42, and the OS 21 obtains the capability information from the printer 104 at A12. The OS 21 passes the capability information obtained from the printer 104 to the supporting program 42 at A13. At A14, the supporting program 42 which has obtained the capability information transmits a completion notification of the processes requested at A08 to the general-purpose printing program 41.

The OS 21 communicates with the printer 104 over communication in accordance with, for example, the IPP (Internet Printing Protocol). It is noted that the supporting program 42 may directly obtain, from the printer 104, the capability information by using, for example, MIB (Management Information Base), instead of transmitting the request to the OS 21.

The capability information obtained from the printer 104 as the real printer includes information of parameters settable as the print setting. Moreover, the capability information includes, for example, status information, information related to a remaining amount of consumables, information related to trays mounted on the printer 104, sheet information related to sheets set on each of the trays, and information related to supportable printing resolutions. Moreover, the printer 104 may have functions, of printing based on the processed data of images processed based on the received print job, such as a function of page-integrating printing such as N in 1, a function of composite printing such as watermarking and a function of saving printing for saving coloring agents. In a case where there is the function of the image processing executable by the printer 104, the printer 104 may pass the information related to the function, as the capability information, to the OS 21. The capability information obtained from the printer 104 may include information indicating post-processing such as stapling in which printed objects are stapled with a staple.

Further, the capability information obtained from the printer 104 includes identifying information for identifying the printer. An example of the identifying information is device identifying information for identifying the device. An example of the device identifying information is a hardware key which is unique to each printer, and information stored in the printer which is manufactured by a specific printer manufacturer.

On the other hand, the capability information obtained from the virtual printer 5 also includes the identifying information. However, the device identifying information is not always included in the identifying information. The identifying information obtained from the virtual printer 5 may include other identification information dedicated to the virtual printer 5. Moreover, the capability information obtained from the virtual printer 5 may include or may not include the information of the parameter of the print setting.

In the present embodiment, the identifying information and the capability information are obtained at the same time and obtained by the same way, however, the obtaining timings and the obtaining way are different from each other. For example, the supporting program 42 may obtain the identifying information from the printer 104 or the virtual printer 5 when the supporting program 42 performs a device search at the timing of installing, and may store the identifying information into the memory 12. Moreover, the supporting program 42 may, for example, directory obtain either of the identifying information and the capability information from the selected printer 104 or the selected virtual printer 5.

Next, there will be described steps performed by the programs in a case where the instruction for the print execution is received via the general-purpose print setting screen with reference to sequences illustrated in FIG. 3 and FIG. 4. In the sequences illustrated in FIG. 3 and FIG. 4, operations are illustrated in a case where the instruction for the print execution is received in a state in which the virtual printer 5 is being selected. For example, a print execution button is provided in the general-purpose print setting screen, and the instruction for the print execution is received by an operation to the print execution button. Since the general-purpose print setting screen is displayed by the request from the information application 43, the operation to the general-purpose print setting screen means that the information application 43 receives the instruction. Accordingly, in the present embodiment, the instruction for the print execution is received by the information application 43, and the print instruction is outputted from the information application 43 to the general-purpose printing program 41 in accordance with the instruction for the print execution. It is noted that the information application 43 may directly receive the instruction for the print execution independently of the general-purpose print setting screen. Also in this case, the print instruction is outputted from the information application 43 to the general-purpose printing program 41 in response to the instruction for the print execution.

Figure 3:
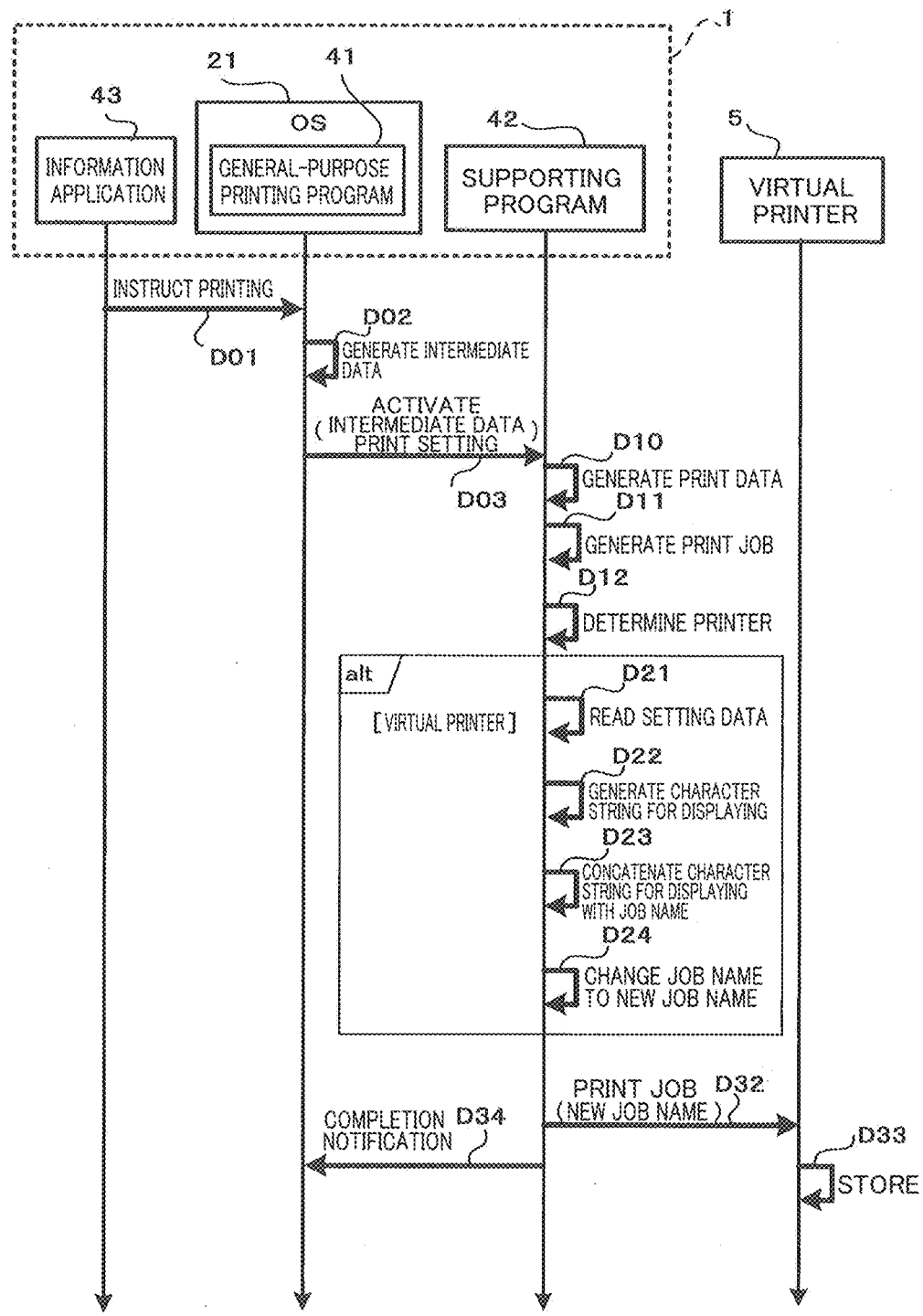
FIG. 3 is a sequence of steps performed in a case where a print instruction is received.

As illustrated in FIG. 3, in a case where the general-purpose printing program 41 receives, at D01, the print instruction from the information application 43 based on the instruction for the print execution by the user via the general-purpose print setting screen in which the printer 104 or the virtual printer 5 is set to the printer which performs printing, the general-purpose printing program 41 generates, at D02, the intermediate data by converting the data format of the information screen received at A04 into a data format of the intermediate data. The intermediate data is, for example, XPS data.

The general-purpose printing program 41 activates the supporting program 42, and passes, to the supporting program 42, the generated intermediate data and the print setting received on the general-purpose print setting screen together with the print instruction at D03. That is, the supporting program 42 is requested to process and is activated from the general-purpose printing program 41 in response to the print instruction, the destination of which is the printer 104 or the virtual printer 5.

The activated supporting program 42 generates the print data based on the intermediate data at D10. That is, the supporting program 42 rasterizes the intermediate data processed by the general-purpose printing program 41 and generates the print data indicating an image to be printed. The print data generated at D11 is, for example, PDL data usable in printing by the virtual printer 5 in the case where the virtual printer 5 is selected. The print data generated at D11 is PDL data solely dedicated to the printer 104 in the case where the printer 104 is selected. Since flexibility of generating the print data rasterized by the supporting program 42 conforming to the printer 104 is larger than that of the print data rasterized by the general-purpose printing program 41, there is a high possibility that the print data suitable for printing in the printer 104 is generated.

At D11, the supporting program 42 generates the print job including the print data generated at D10, the print setting received at D03 and a printing command. The supporting program 42 gives a job name to the print job. The job name may be automatically given to the print job by the supporting program 42 or may be arbitrary given to the print job by the operation of the user.

The supporting program 42 executes a printer determining process at D12. The printer determining process is a process of determining whether the selected printer is the virtual printer or not based on the identifying information included in the capability information. In a case where, for example, the identifying information included in the capability information received from the general-purpose printing program 41 at A13 in FIG. 2 includes the device identifying information, the supporting program 42 determines that the selected printer is not the virtual printer 5, but the real printer. On the other hand, in a case where, for example, the identifying information included in the capability information received from the general-purpose printing program 41 at A13 in FIG. 2 does not include the device identifying information or includes the identifying information dedicated to the virtual printer 5, the supporting program 42 determines that the selected printer is the virtual printer 5.

When the supporting program 42 determines that the selected printer is the virtual printer 5 in the determination at D12 (alt: the virtual printer), the supporting program 42 reads the setting data 46 from the memory 12 at D21. Then, at D22, the supporting program 42 generates the character string for displaying indicating at least a part of the print setting received from the general-purpose printing program 41 at D03. In the present embodiment, the supporting program 42 generates the character string for displaying based on the print setting received from the general-purpose printing program 41 at D03 in accordance with the configuration indicated by the setting data 46 read at D21. The process at D22 is an example of a generating process.

The configuration of the character string for displaying indicated by the setting data 46 includes, for example, a designation of items of the print setting included in the character string for displaying, a designation of an order of the items of the print setting included in the character string for displaying, and a designation of characters corresponding to the parameters of the items of the print setting included in the character string for displaying.

For example, the setting data 46 includes information designating "SHEET SIZE" and "COLOR PRINTING" as the items of the print setting included in the character string for displaying. Moreover, the setting data 46 includes information of the order in which "SHEET TRAY" is displayed first, and "COLOR PRINTING" is displayed second. Further, the setting data 46 includes information in which characters corresponding to the parameters, "A4 SIZE" and "A3 SIZE", of "SHEET SIZE" are set to "A4" and "A3", and information in which characters corresponding to the parameters, "COLOR" and "MONOCHROME", of "COLOR PRINTING" are set to "C" and "M".

The supporting program 42 receives, for example, the print setting at D03 in which the item of the print setting of "SHEET SIZE" is set to "A3 SIZE", the item of the print setting of "COLOR PRINTING" is set to "COLOR", and the item of the print setting of "DUPLEX PRINTING" is set to "DUPLEX PRINTING" as the parameter. In this case, the supporting program 42 includes the print setting of "SHEET SIZE" and "COLOR PRINTING" into the character string for displaying based on the setting data 46, and does not include the print setting of "DUPLEX PRINTING" into the character string for displaying. The supporting program 42 arranges the setting parameters, "A3 SIZE" and "COLOR" of "SHEET SIZE" and "COLOR PRINTING" in the order designated by the setting data 46. The supporting program 42 respectively converts the parameters, "A4 SIZE" and "COLOR", set to the items of "SHEET SIZE" and "COLOR PRINTING" into characters, "A4" and "C", based on the setting data 46. In accordance with the above described conditions, the supporting program 42 generates the character string for displaying, "A4_C", indicating the part of the print setting received at D03.

Moreover, the supporting program 42 may add a character string indicating a current date and time to the character string indicating the print setting, and may set the added character string to the character string for displaying. Since the character string indicating the current date and time is included in the character string for displaying, there is a high possibility that the unique character string for displaying is generated.

At D23, the supporting program 42 generates a new job name by concatenating the job name given to the print job at D11 with the character string for displaying generated at D22. At D24, the supporting program 42 changes the job name given to the print job at D11 to the new job name. Accordingly, the print job and the character string for displaying are associated with each other.

For example, the job name of the print job generated at D11 is "JN1", and the character string for displaying corresponding to the print setting included in the print job is "A3_C". In this case, the supporting program 42 generates a new job name "A3_C_JN1" by concatenating the character string for displaying with the job name "JN1" of a first print job in front of the job name "JN1". The supporting program 42 change from the job name "JN1" to the new job name "A3_C_JN1" regarding the first print job.

It is noted that a concatenating rule for concatenating the character string for displaying with the job name is not limited to the present embodiment. That is, the character string for displaying may be concatenated with the job name in the rear of the job name. However, since the character string for displaying is concatenated with the job name in front of the job name, it is possible to easily display the character string for displaying when the new job name is displayed on the display of the real printer.

In the case where the virtual printer 5 is selected, the supporting program 42 transmits the print job with the new job name to the virtual printer 5 at D32. The process at D32 is an example of a transmitting process. Further, the supporting program 42 returns a completion notification of the process requested at D03 to the general-purpose printing program 41 at D34.

The cloud server 6 having the virtual printer 5 receives the print job transmitted from the PC 1 via the Internet 8 (see FIG. 1), and stores the print job into an internal memory at D33. The print job has become the new job name in which the character string for displaying is concatenated with the job name, and the print job is stored in a state in which the original job name and the character string for displaying are associated with each other.

Figure 4:
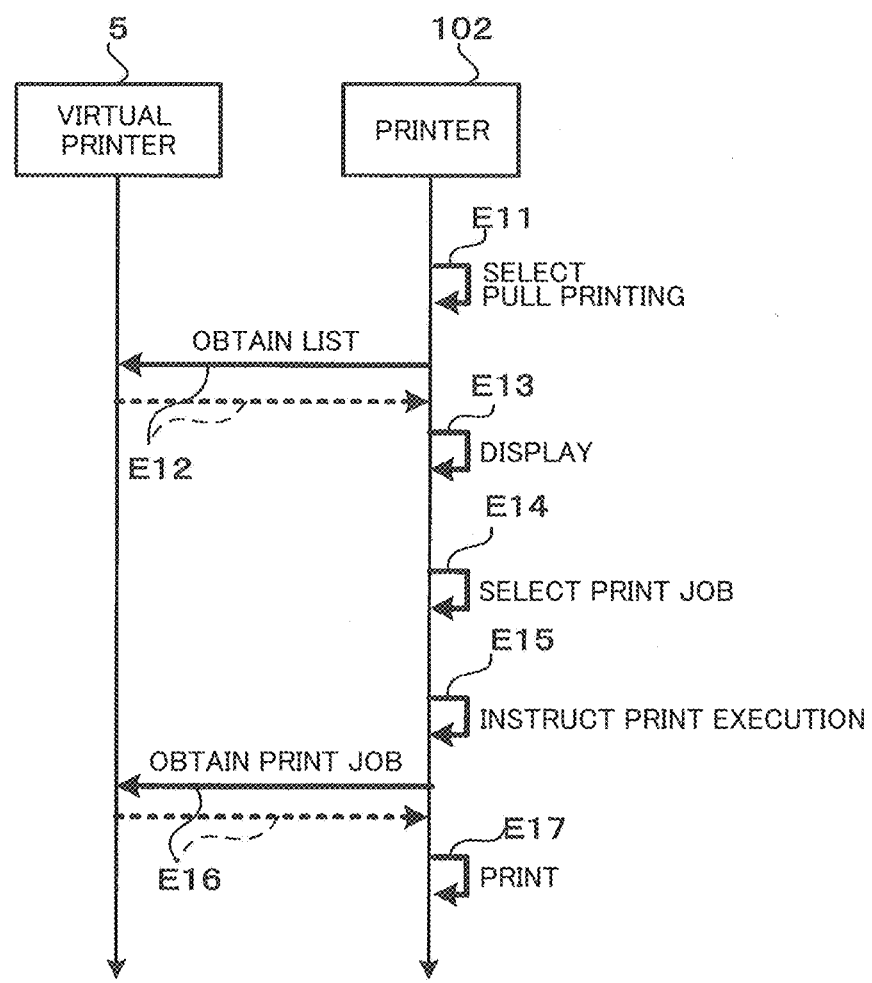
FIG. 4 is a sequence illustrating an example of printing steps.

For example, as illustrated in FIG. 4, when the printer 102 as the real printer receives, at E11, selection of a function of pull printing in which the printer 102 receives the print job from the virtual printer 5 of the cloud server 6 and prints, the printer 102 obtains a list of the job names from the virtual printer 5 at E12. In response to the request from the printer 102, the cloud server 6 generates the list of the job names associated with the print job and transmits the list of the job names to the printer 102. The printer 102 displays the received list of the job names on the display 112 at E13.

Figure 5A:
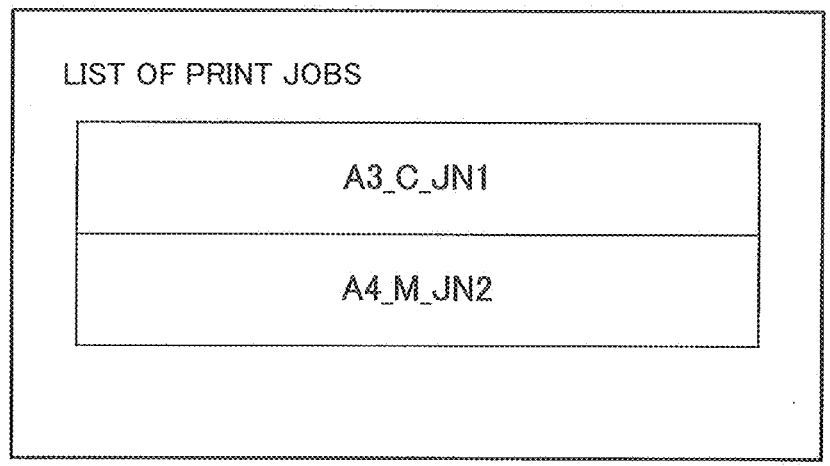
FIG. 5A is a view illustrating an example of a display.

The job name of the print job transmitted from the supporting program 42 to the virtual printer 5 is changed to the new job name in which the job name and the character string for displaying are concatenated with each other. Accordingly, as illustrated in FIG. 5A, the new job names including the character strings for displaying are displayed on the display 112 of the printer 102. It is noted that the request from the printer 102 to the cloud server 6 may be, for example, a transmission request for a list of all job names of the print jobs of the login users, and may be an individual transmission request for the job name of the print job.

For example, as illustrated in FIG. 5A, two kinds of job names of the print jobs "A3_C_JN1" and "A4_C_JN2" are displayed on the display 112. The user can recognize that the first print job having the job name "JN1" is printed in color on the A3 size sheet by the display of "A3" and "C". Moreover, the user can recognize that a second print job having the job name "JN2" is printed in monochrome on the A4 size sheet by the display of "A4" and "M". The printer 102 is a device supporting the sheet size equal to or smaller than the A4 size and only monochrome printing. The user recognizes that the printer 102 is not capable of performing the first print job and is capable of performing the second print job by the indication on the display 112. As a result, the user selects the second print job at E14, and inputs the instruction for the print execution to the printer 102 at E15.

The printer 102 having received the instruction for the print execution obtains the print job corresponding to the new job name "A4_C_JN2" from the cloud server 6 at E16. That is, the printer 102 requests for transmitting the print job corresponding to the new job name "A4_C_JN2" to the cloud server 6, and the cloud server 6 transmits the corresponding print job to the printer 102. When the printer 102 receives the print job, the printer 102 prints the print data based on the print setting included in the print job at E17. According to this, the printed object is generated.

On the other hand, in a case where the print instruction is received in a state in which the printer 104 as the real printer is being selected, the supporting program 42 determines that the selected printer is not the virtual printer 5 at the determination at D12. In a case where the supporting program 42 transmits the print job to the printer 104, there is a low possibility that the print setting of the print job becomes an improper the print setting. Or, the supporting program 42 can check whether the print setting of the print job is proper or not before transmitting the print job to the printer 104. Accordingly, in the case where the printer 104 is selected, the supporting program 42 transmits the print job generated at D11 to the printer 104 without processing the process at D21 to D24. That is, the supporting program 42 does not transmit the print job to the printer 104 in the state in which the print job and the character string for displaying are associated with each other.

Figure 5B:
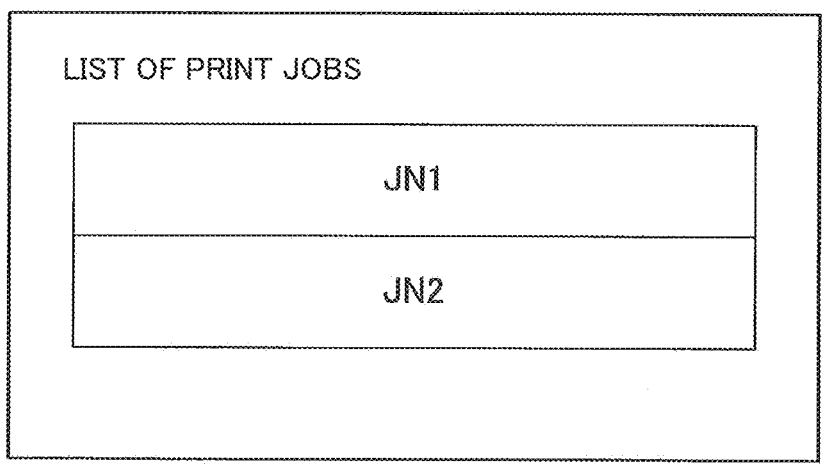
FIG. 5B is a view illustrating an example of the display.

The printer 104 having received the print job from the PC 1, for example, stores the received print job into an internal memory. As illustrated in FIG. 5B, in a case where the printer 104 prints the stored print job, for example, the printer 104 displays the job name of the stored print job on the own display 114 of the printer 104. The printer 104 receives the print job not associated with the character string for displaying. Accordingly, only the job name given to the print job at D11 is displayed on the display 114. As a result of this, since the job name of the print job is simply displayed on the display 114 of the printer 104, it is possible for the user to easily select the print job.

It is noted that the transmission of the print data and the printing command to the virtual printer 5 or the printer 104 may be performed by the general-purpose printing program 41. That is, the supporting program 42 may pass the generated print data to the general-purpose printing program 41 such that the generated print data is transmitted from the PC 1 to the virtual printer 5 or the printer 104 as the destination of the print data. In this case, the general-purpose printing program 41 transmits the print data and so on received from the supporting program 42 to the virtual printer 5 or the printer 104.

Figure 6:
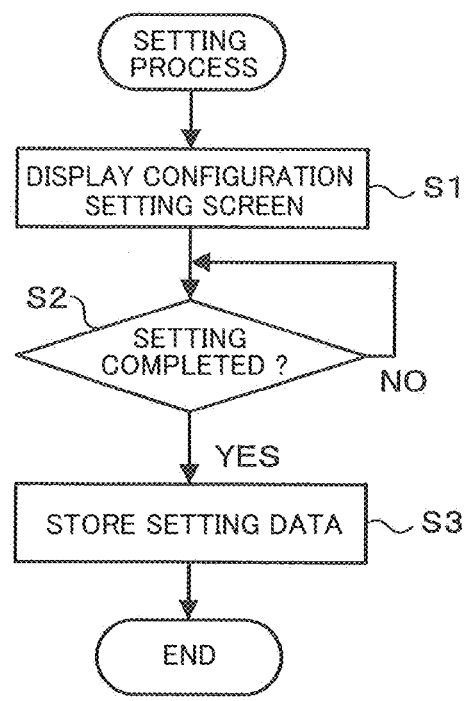
FIG. 6 is a flowchart explaining an example of steps of a setting process.

Next, there will be described the above described steps of the setting process with reference to a flowchart illustrated in FIG. 6. In this flowchart, there will be described a case in which the supporting program 42 corresponding to the printer 104 executes the setting process in FIG. 6.

When the supporting program 42 receives an instruction for setting the configuration of the character string for displaying, for example, on a utility screen provided by the supporting program 42, the CPU 11 causes the PC 1 to display, for example, a configuration setting screen D1 illustrated in FIG. 7 on the display 13a of the PC 1 at S1. The configuration setting screen D1 is a screen for receiving setting or changing the configuration of the character string for displaying. The configuration setting screen D1 is an example of a setting screen. For example, a detailed setting button is provided on the general-purpose print setting screen. The supporting program 42 is activated by the general-purpose printing program 41 by an operation to the detailed setting button, and the supporting program 42 can display a detailed setting screen. The detailed setting screen is a screen for receiving the print setting of a unique function of the printer to which the supporting program 42 conforms. In the present embodiment, the configuration setting screen D1 is prepared independently of the detailed setting screen, and the configuration setting screen D1 is activated at the arbitrary timing, however, the configuration setting screen D1 may be configured as a part of the detailed setting screen. For example, the detailed setting screen includes an operational object capable of activating the configuration setting screen D1, and the configuration setting screen D1 may be displayed on the display 13a in response to an operation to the operational object.

For example, as illustrated in FIG. 7, an item name displaying column 221, an item selecting column 222, an order setting column 223, a character setting column 224 and a completion button SW1 are displayed on the configuration setting screen D1.

The item name of each of the plurality of items of the print setting respectively corresponding to all functions to which the supporting program 42 conforms are displayed in the item name displaying column 221. A plurality of cells respectively corresponding the plurality of items of the print setting are provided in each of the item selecting column 222, the order setting column 223 and the character setting column 224. The item to be included in the character string for displaying is set in the item selecting column 222. The item of the print setting corresponding to the cell with a check mark in the item selecting column 222 becomes subject to the character string for displaying, and the item of the print setting corresponding to the cell in the item selecting column 222 without a check mark does not become subject to the character string for displaying. In a case where the number of items of the print setting becoming subject to the character string for displaying becomes larger, there is a possibility that the user cannot easily recognize the print setting indicated by the character string for displaying when the character string for displaying is displayed. Accordingly, the number of items of the print setting included in the character string for displaying may be limited.

The order of the plurality of items of the print setting included in the character string for displaying are set in the order setting column 223. The order of the plurality of items of the print setting may be automatically set by the supporting program 42 in accordance with the frequency of the change of the print setting, and may be set by an operation of the user who selects one of a plurality of patterns of the order prepared by the supporting program 42 in accordance with the purpose. Moreover, the order of the plurality of items of the print setting may be arbitrary set by an operation of the user. In the character setting column 224, for example, a plurality of characters, which are displayed as the character of the job name of the print job, respectively corresponding to the plurality of items of the print setting included in the character string for displaying are set. The plurality of parameters corresponding and settable to each of the plurality of items of the print setting are displayed in the character setting column 224, and the plurality of characters can be respectively set to the plurality of parameters. The plurality of characters may be arbitrary set, and may be select among a plurality of candidates.

For example, as illustrated in the item of the print setting "DUPLEX PRINTING", regarding the item corresponding to the cell in the item selecting column 222 without a check mark, the operation to each of the order setting column 223 and the character setting column 224 may be limited. Since the operation to each of the order setting column 223 and the character setting column 224 is excluded from the subject of setting, it is possible to save time of setting.

Returning to FIG. 6, in a case where the completion button SW1 illustrated in FIG. 7 is not operated, the CPU 11 determines that the setting of the configuration of the character string for displaying is not completed (S2:NO). In this case, the CPU 11 receives the setting of the configuration of the character string for displaying via the configuration setting screen D1.

On the other hand, in a case where the completion button SW1 illustrated in FIG. 7 is operated, the CPU 11 determines that the setting of the configuration of the character string for displaying is completed (S2:YES). In this case, the CPU 11 stores the setting of the configuration of the character string for displaying received via the configuration setting screen D1 into the memory 12 as the setting data 46. In a case where there is the already-existing setting data 46 in the memory 12, the CPU 11 overwrites the setting data 46 by the new setting of the configuration of the character string for displaying.

As described above, in the case where the general-purpose printing program 41 receives the print instruction, the destination of which is the virtual printer 5, the supporting program 42 of the present embodiment transmits the print job to the virtual printer 5 in the state in which the character string for displaying indicating at least the part of the print setting is associated with the job name of the print job by concatenating the character string for displaying with the print job. For example, the printer 102 connected to the virtual printer 5 receives the job name of the print job from the cloud server 6 as the virtual printer 5 in the state in which the job name of the print job and the character string for displaying are associated with each other, and displays the job name of the print job and the character string for displaying on the own display 112 in the state in which the job name of the print job and the character string for displaying are associated with each other. As a result of this, since the user can recognize the print setting set to the print job in the printer 102 before selecting the print job, it is possible to decrease a possibility that the user selects the print job which is not executable by the printer 102.

Moreover, the supporting program 42 of the present embodiment displays the new job name on the display 112 of the printer 102 connected to the virtual printer 5 by concatenating the character string for displaying with the job name of the print job. The display 112 which displays the new job name displays the character string for displaying together with the job name. Accordingly, since there is no need to process for displaying the character string for displaying in the printer 102, it is possible to increase general versatility of the present system.

SECOND EMBODIMENT

Figure 8:
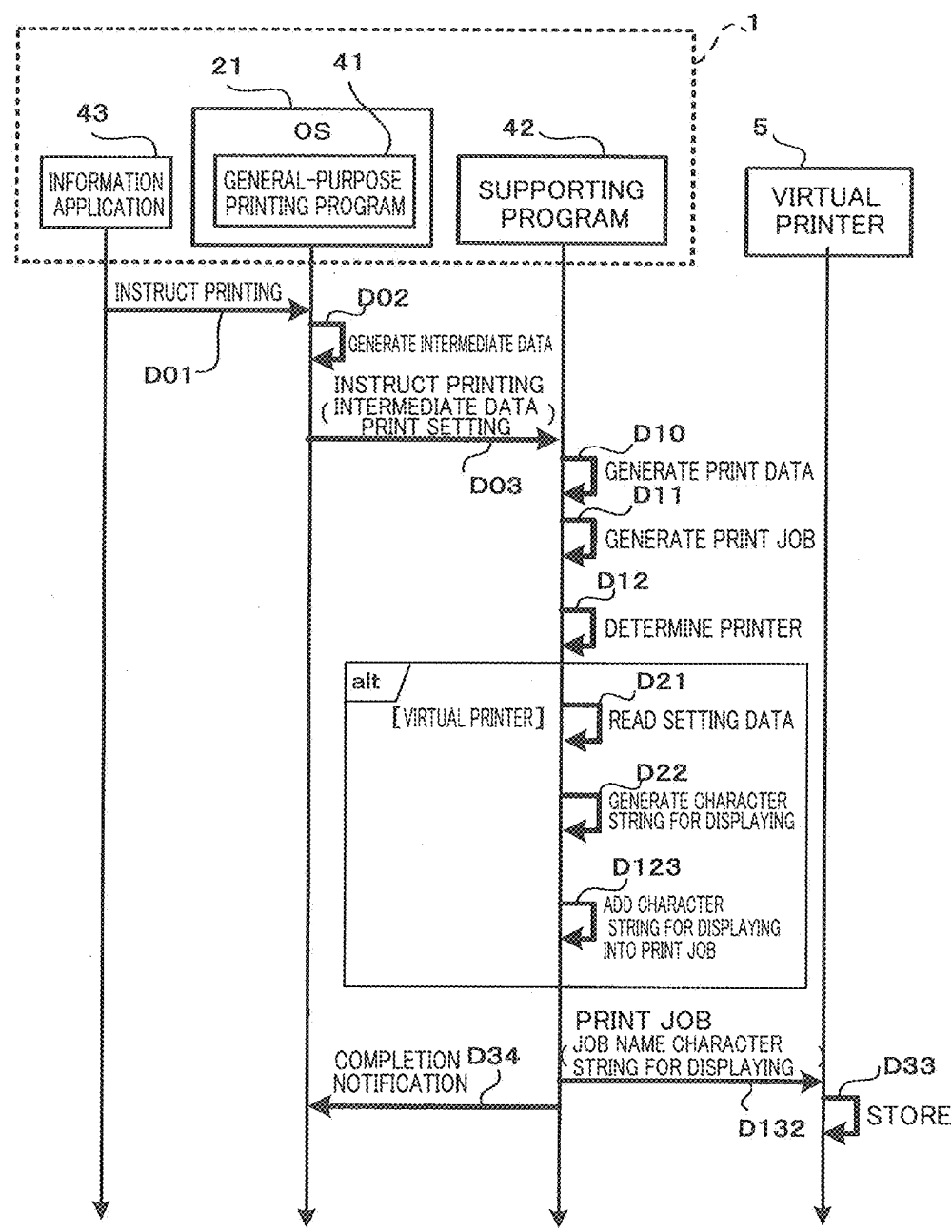
FIG. 8 is a sequence illustrating an example of steps performed in a case where the print instruction is received.
Figure 9:
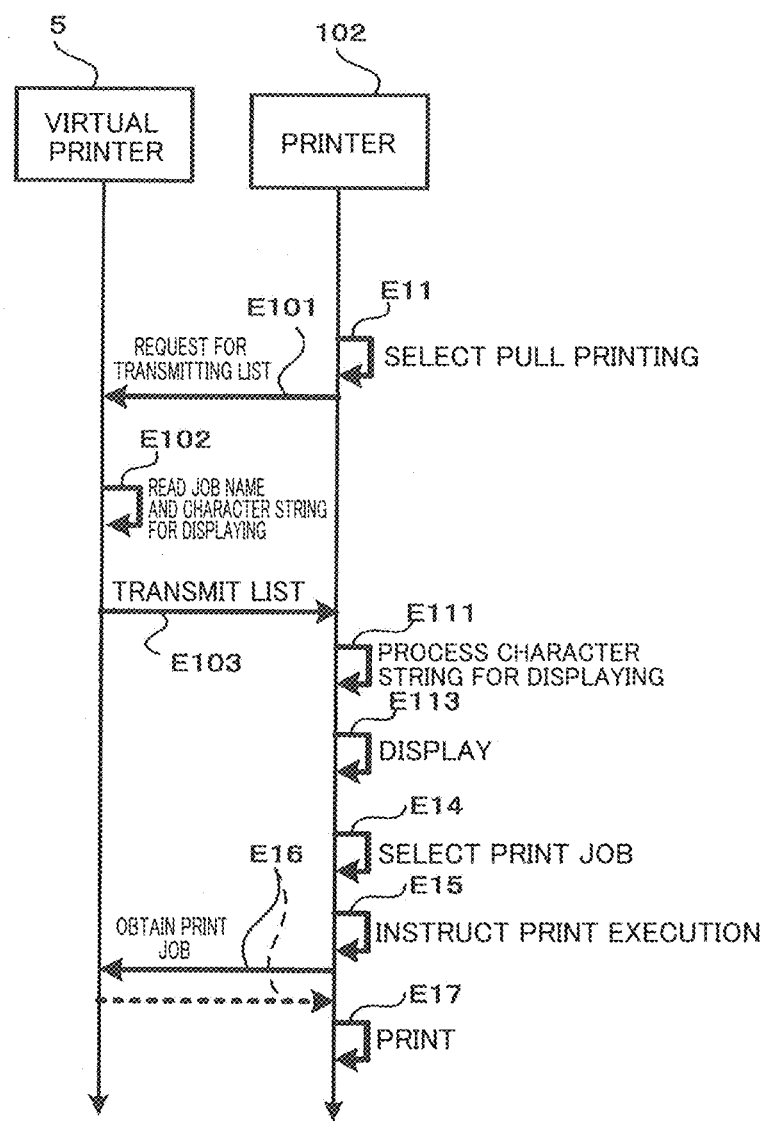
FIG. 9 is a sequence illustrating an example of printing steps.

Next, there will be described a second embodiment of the present disclosure with reference to the drawings. FIG. 8 is a sequence illustrating an example of steps performed in a case where the print instruction is received. FIG. 9 is a sequence illustrating an example of printing steps. FIG. 10 is a view illustrating an example of a display. In the present embodiment, since the supporting program 42 associates the print job with the character string for displaying by embedding the character string for displaying into the print job, the supporting program 42 does not change the job name of the print job. This feature is different from the feature of the first embodiment in which the job name of the print job is changed to the new job name obtained by concatenating the character string for displaying with the job name. Here, there will be mainly described the configuration different from the first embodiment, and the same reference numerals as used in the first embodiment are used to designate the corresponding elements and processes of the second embodiment.

As illustrated in FIG. 8, in the case where the supporting program 42 receives the print instruction in the state in which the virtual printer 5 is selected, the supporting program 42, at D123, adds the character string for displaying generated at D22 to the print job generated at D11. For example, the supporting program 42 adds the character string for displaying generated at D22 into an extended partition of the print job generated at D11. Accordingly, it is possible to avoid a case in which the added character string for displaying affects printing of the print job.

The supporting program 42 transmits, to the virtual printer 5, the print job into which the character string for displaying is added at D123. That is, the supporting program 42 transmits the print job to the cloud server 6 as the virtual printer 5 without changing the job name of the print job given at D11. When the cloud server 6 receives the print job via the Internet 8, the cloud server 6 store the print job into the internal memory at D33.

As illustrated in FIG. 9, when the cloud server 6, for example, is requested to transmit the list of the print jobs from the printer 102 at E101, the cloud server 6 reads the job name and the character string for displaying from each of the stored print jobs at E102, and, at E103, the cloud server 6 transmits the list of the print jobs to the printer 102 in a state in which the print jobs are listed. That is, the cloud server 6 transmits the list of the print job to the printer 102 in a state in which the job name and the character string for displaying are separated from each other.

The printer 102 processes the character string for displaying received from the virtual printer 5 at E111, and, E113, the printer 102 displays the character string for displaying on the display 112 in the state in which the character string for displaying and the print job are associated with each other. Regarding the character string for displaying which is separately received from the print job, for example, the printer 102 converts characters included in the character string for displaying into character information indicating the item of the print setting or the parameter. For example, the printer 102 converts "A3" included in the character string for displaying into "A3 size", and converts "C" into "COLOR". Moreover, for example, the printer 102 converts "A4" included in the character string for displaying into "A4 size", and converts "M" into "MONOCHROME". As illustrated in FIG. 10, the printer 102, for example, displays the converted character information and the job name in the list form on the display 112 in the state in which the converted character information and the job name are associated with each other. It is noted that the printer 102 may display a preview screen on which an image indicating the print setting associated with the print job is displayed on the display 112 in a state in which the image and the job name are associated with each other by converting the character string for displaying associated with the job name into image data of the image indicating the print setting indicated by the character string for displaying. The printer 102 may display the received character string for displaying as received on the display 112 without processing the received character string for displaying.

As described above, in the case where the general-purpose printing program 41 receives the print instruction, the destination of which is the virtual printer 5, the supporting program 42 of the present embodiment transmits the character string for displaying to the virtual printer 5 in the state in which the character string for displaying and the print job are associated with each other by adding the character string for displaying into the print job. For example, the printer 102 connected to the virtual printer 5 receives the character string for displaying from the cloud server 6 as the virtual printer 5 in the state in which the character string for displaying and the job name of the print job are separate from each other. The printer 102 does not display the received job name as received on the display 112, but converts the received character string for displaying into the character information concretely indicating the print setting and displays the character information on the display 112 in the state in which the character information and the job name are associated with each other. As a result of this, since the user can recognize the print setting set to the print job in the printer 102 before selecting the print job, it is possible to decrease the possibility that the user selects the print job which is not executable by the printer 102.

Moreover, the supporting program 42 of the present embodiment adds the character string for displaying into the print job, and transmits the character string for displaying together with the print job to the virtual printer 5 in the state in which the character string for displaying is separated from the job name. As a result of this, the printer 102 obtains the character string for displaying from the virtual printer 5 separately from the job name, and processes based on the obtained character string for displaying. Accordingly, it is possible to display the print setting corresponding to the character string for displaying in an easy to understand manner. The printer 102 needs to perform the process of displaying the character string for displaying, however, it is possible to increase flexibility of the displaying manner of the print setting indicated by the character string for displaying.

It is noted that, like the first embodiment, if the supporting program 42 changes the job name of the print job to the new job name by concatenating the character string for displaying with the job name, there is no need to read the character string for displaying from the print job by the cloud server 6 and transmit the character string for displaying together with the job name to the printer 102. It is noted that the new job name generated by the supporting program 42 may be generated by ways other than the way of concatenating the character string for displaying with the job name, for example, it may be appropriate that the character string for displaying is included in the print job such that the character string for displaying can be read from the print job or can be identified.

While the embodiments have been described above, it is to be understood that the disclosure is an only example and is not limited to the details of the illustrated embodiments, but may be embodied with various changes and modifications, which may occur to those skilled in the art, without departing from the spirit and scope of the disclosure. For example, the device connected to the PC 1 is not limited to the printers, and it may be a device having a printing function such as a multifunctional peripheral, a copying device, a facsimile device. Moreover, the number of the real printers connected to the PC 1 and the number of the real printers connected to the virtual printer 5 are not limited to the embodiments illustrated in the drawings.

Moreover, the character string for displaying not including the character string indicating the current date and time may be generated at D22 in FIG. 3. However, in a case where the supporting program 42 generates the character string for displaying indicating at least the part of the print setting and the current date and time, the date and time at which the print instruction is received is displayed on the display in the real printer connected to the virtual printer 5. As a result of this, the user can identify the print job from other print jobs even in a case where the plurality of print jobs each having the same print setting are transmitted.

Moreover, even in a case where the supporting program 42 receives the print instruction in a state in which the real printer is selected, the supporting program 42 may generate the character string for displaying and transmit the character string for displaying in the state in which the character string for displaying and the print job are associated with each other. However, in the case where the supporting program 42 receives the print instruction in the state in which the real printer is selected, it is possible to simply display the job name on the display in the read printer when the supporting program 42 does not transmit the character string for displaying to the real printer. In this case, it is possible for the user to easily select the job name in the real printer.

Moreover, the configuration of the character string for displaying may be determined in advance. However, in a case where the configuration of the character string for displaying can be arbitrary set by the user by the setting process illustrated in FIG. 6, it is possible to display the character string for displaying, which is fit for the user's needs, on the display of the real printer connected to the virtual printer 5.

Moreover, the supporting program 42 may include all the setting items of the print setting into the character string for displaying. However, if all the setting items of the print setting are included into the character string for displaying, the character string for displaying becomes long and the display of the character string for displaying in the real printer becomes complicated. Accordingly, the supporting program 42 may cause the user to determine whether each of the items of the print setting is included into the character string for displaying or not in the setting process illustrated in FIG. 6. As a result of this, it is possible to display the character string for displaying in the real printer in an easy to see manner.

Moreover, the supporting program 42 may not set the order of the items of the print setting included in the character string for displaying. However, in a case where the character string for displaying becomes long, there is a possibility that the setting of the item in need of identifying the print job is not easy to understand. Accordingly, the supporting program 42 may set the order of the items of the print setting included in the character string for displaying by the setting process illustrated in FIG. 6. As a result of this, it is possible to display the item in need of identifying the print job in an easy to understand manner for the user.

Moreover, the supporting program 42 may not set the character corresponding to the parameter of each of the items of the print setting included in the character string for displaying. However, there is a possibility that the character corresponding to the parameter of each of the items of the print setting can be difficult to memorize. Accordingly, the supporting program 42 may set characters determined by the user to the parameter of each of the items by the setting process illustrated in FIG. 6. As a result of this, it is possible for the user to easily understand the meaning of the characters included in the character string for displaying and easily understand the setting of each of the items of the print setting in the real printer.

Moreover, the cloud server 6 may be a server provided, on the Internet 8, by the manufacturer supplying the supporting program 42, and may be a commercial server such as OneDrive and DropBox. OneDrive is a registered trademark. DropBox is a registered trademark.

Moreover, in the present embodiment, as the operations of the supporting program 42, only printing operations are described in detail, however, the supporting program 42 may have other functions. Moreover, the program executing the processes of the present embodiment is not limited to the supporting program 42, and the program may be a program that receives an instruction from the OS 21 or the general-purpose printing program 41 when executing printing by using the general-purpose printing program 41. For example, the program may be a printing workflow application what is called Print Workflow, the specification of which is published by Microsoft.

Moreover, the execution timing of the supporting program 42 is not limited to the example of the present embodiment. For example, the supporting program may be executed by a direct instruction for executing from the OS 21, or the supporting program 42 may be a resident program. In a case the supporting program is the resident program, the supporting program 42 may perform the above described operations when receiving an execution command.

Moreover, in the any flowcharts disclosed in the present embodiment, the execution order of the plurality of processes in the plurality of any steps may be changed or the plurality of processes may be executed in parallel, without causing a contradiction of the processes.

Moreover, the processes disclosed in the present embodiment may be executed by hardware such as a single CPU, a plurality of CPUs, an ASIC, and a combination of the CPU, the plurality of CPUs and the ASIC. Moreover, the processes disclosed in the present embodiment may be embodied by various kinds of embodiments such as a storage medium storing a program executing the processes and methods.

What is claimed is:

1. A non-transitory storage medium storing a supporting program executable by a computer of an information processing apparatus,
wherein the supporting program is configured to support a printing program of an operating system of the information processing apparatus,
wherein the information processing apparatus is connectable to a virtual printer in a server on a network, and the server is capable of receiving and storing a plurality of print jobs that are transmitted to the virtual printer,
wherein a connected printer connected to the server is configured to receive a selection of a print job, that is to be printed, of the plurality of print jobs stored in the server and receive the selected print job from the server, the connected printer being capable of printing based on the received print job,
wherein the supporting program, when executed by the computer, causes the information processing apparatus to execute:
when being requested from the printing program of the operating system for processing in response to receipt of a print instruction, outputted from an application program installed on the information processing apparatus, for causing the printing program of the operating system to perform printing of an image, a destination of which is set to the virtual printer,
obtaining, from the printing program of the operating system, image data indicating the image, which is to be printed, of a print job;
creating a new job name of the print job; and
transmitting, to the virtual printer, (i) the print job, for causing information processing apparatus to print based on the obtained image data, and (ii) the created new job name for displaying in a state in which the print job and the new job name for displaying are associated with each other,
wherein the print job transmitted to the virtual printer is stored in the server in the state in which the print job is associated with the new job name for displaying, and, in response to a request from the connected printer to the server, the new job name is passed to the connected printer, and
wherein the new job name for displaying passed to the connected printer is displayed on a display of the connected printer, and
wherein the supporting program, when executed by the computer, causes the information processing apparatus to execute:
when being requested from the printing program of the operating system for processing in response to receipt of a print instruction, outputted from the application program installed on the information processing apparatus, for causing the printing program of the operating system to perform printing of an image, a destination of which is not set to the virtual printer,
transmitting the print job to the destination, which in not set to the virtual printer, without creating a new job name.

2. The non-transitory storage medium according to claim 1, wherein the new job name includes a previous job name which is used before the creating.

3. The non-transitory storage medium according to claim 1, wherein the new job name includes a character string generated based on print settings of the print job.

4. The non-transitory storage medium according to claim 1, wherein the new job name includes a character string indicating a current date and time.

5. A printing system comprising a supporting program of an information processing apparatus and a connected printer connected to a server,
wherein the supporting program is executable by a computer of the information processing apparatus and is configured to support a printing program of an operating system of the information processing apparatus,
wherein the information processing apparatus is connectable to a virtual printer in the server on a network,
wherein the supporting program, when executed by the computer, causes the information processing apparatus to execute:
when being requested from the printing program of the operating system for processing in response to receipt of a print instruction, outputted from an application program installed on the information processing apparatus, for causing the printing program of the operating system to perform printing of an image, a destination of which is set to the virtual printer,
obtaining, from the printing program of the operating system, image data indicating the image, which is to be printed, of a print job;
creating a new job name of the print job; and
transmitting, to the virtual printer, (i) the print job, for causing information processing apparatus to print based on the obtained image data, and (ii) the created new job name for displaying in a state in which the print job and the new job name for displaying are associated with each other,
wherein the server stores the print job and the new job name in the state in which the print job and the new job name are associated with each other and, in response to a request from the connected printer, passes, to the connected printer, the new job name for display, and
wherein the connected printer obtains the new job name for displaying passed from the server after outputting the request to the server, and receives an execution instruction of the print job corresponding to the new job name by displaying the obtained new job name for displaying on a display of the connected printer, and
wherein the supporting program, when executed by the computer, causes the information processing apparatus to execute:
when being requested from the printing program of the operating system for processing in response to receipt of a print instruction, outputted from the application program installed on the information processing apparatus, for causing the printing program of the operating system to perform printing of an image, a destination of which is not set to the virtual printer,
transmitting the print job to the destination, which in not set to the virtual printer, without creating a new job name.

6. The printing system according to claim 5, wherein the new job name includes a previous job name which is used before the creating.

7. The printing system according to claim 5, wherein the new job name includes character strings generated based on print settings of the print job.

8. The printing system according to claim 5, wherein the new job name includes a character string indicating a current date and time.

\* \* \* \* \*